United States Patent
Yoshida et al.

(10) Patent No.: US 7,180,898 B2
(45) Date of Patent: Feb. 20, 2007

(54) COMMUNICATION SYSTEM

(75) Inventors: Kenichi Yoshida, Ebina (JP); Takashi Maruyama, Ebina (JP); Hitoshi Yokota, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 801 days.

(21) Appl. No.: 09/987,816

(22) Filed: Nov. 16, 2001

(65) Prior Publication Data
US 2002/0061013 A1 May 23, 2002

(30) Foreign Application Priority Data
Nov. 20, 2000 (JP) ............... 2000-353008

(51) Int. Cl.
H04L 12/28 (2006.01)
H04L 12/56 (2006.01)

(52) U.S. Cl. ............ 370/395.3; 370/229; 370/230; 370/352; 370/400; 455/433; 455/445; 455/458; 455/461; 455/435.2; 455/440; 455/234.1; 455/232.1; 455/245.1; 455/422.1

(58) Field of Classification Search ........... 370/465, 370/229, 230, 395.3, 260–264, 468, 268, 370/352, 394, 400; 455/433, 445, 458, 461, 455/435.2, 440, 234.1, 232.1, 245.1, 422.1
See application file for complete search history.

(56) References Cited

U.S. PATENT DOCUMENTS

| 5,862,203 A * | 1/1999 | Wulkan et al. ........ 379/114.02 |
| 6,233,452 B1 * | 5/2001 | Nishino .................. 455/435.2 |
| 6,535,483 B1 * | 3/2003 | Christie et al. ............ 370/230 |
| 6,584,307 B1 * | 6/2003 | Antonucci et al. ....... 455/422.1 |

FOREIGN PATENT DOCUMENTS

| JP | 9-172430 | 6/1997 |
| JP | 10-304071 | 11/1998 |
| JP | 2000-032047 | 1/2000 |

* cited by examiner

Primary Examiner—Chi Pham
Assistant Examiner—Raj Jain
(74) Attorney, Agent, or Firm—Mattingly, Stanger, Malur & Brundidge, P.C.

(57) ABSTRACT

A communication system is provided of selecting the most approximate line from two or more connectable lines and connecting with a provider through the selected line in the mobile communication environment. The mobile device and the public phone of each phone company provide a standard wireless data communication facility, respectively. The public line pre-stores information about dial-up numbers of access points and a transmission speed of an internet provider. When the user starts the communication, the mobile device operates to obtain the most approximate access point information from each of the public phones and then dial up the most approximate access point through the public phone/line well-specified to the user.

10 Claims, 12 Drawing Sheets

AP INFORMATION OF A COMPANY'S PROVIDER

| PROVIDER | | ACCESS POINT | | | | | OPTION INFORMATION | | ASSOCIATED PROVIDER |
|---|---|---|---|---|---|---|---|---|---|
| NO. | NAME | NO. | NAME 1 | NAME 2 | PHONE NUMBER | LINE | SPEED | LINE CONGESTION | CONTRACT | |
| 16 | ANET | 1 | KANAGAWA | MACHIDA1 | 042-786-0001 | ANALOG | 56k | FIG. 6 | FIG. 7 | 57,125 |
| | | | | | | ISDN | 64k | ... | ... | |
| | | 2 | KANAGAWA | MACHIDA2 | 046-769-0002 | ANALOG | 56k | ... | ... | |
| | | | | | | ISDN | 64k | ... | ... | |
| | | 3 | KANAGAWA | KAWASAKI1 | 044-739-0003 | ANALOG | 33.6k | | | |
| | | | | | | ISDN | 64k | | | |
| | | 4 | KANAGAWA | KAWASAKI2 | 044-793-0004 | ANALOG | 56k | | | |
| | | | | | | ISDN | 64k | | | |

FIG. 4

AP INFORMATION OF B COMPANY'S PROVIDER

| PROVIDER | | ACCESS POINT | | | | | OPTION INFORMATION | | ASSOCIATED PROVIDER |
|---|---|---|---|---|---|---|---|---|---|
| NO. | NAME | NO. | NAME 1 | NAME 2 | PHONE NUMBER | LINE | SPEED | LINE CONGESTION | CONTRACT | |
| 73 | BNET | 1 | KANAGAWA | KAWASAKI1 | 044-520-1000 | ANALOG | 33.6k | FIG. 6 | FIG. 7 | 7,23,91 |
| | | | | | | ISDN | 64k | ... | ... | |
| | | 2 | KANAGAWA | KAWASAKI2 | 044-542-1001 | ANALOG | 56k | ... | ... | |
| | | | | | | ISDN | 64k | ... | ... | |
| | | 3 | KANAGAWA | KAWASAKI3 | 044-522-1002 | ANALOG | 56k | | | |
| | | | | | | ISDN | 64k | | | |
| | | | | | | ISDN | 128k | | | |

FIG. 5

AP INFORMATION OF A COMPANY'S PROVIDER

| PROVIDER | | ACCESS POINT | | | | | OPTION INFORMATION | | |
|---|---|---|---|---|---|---|---|---|---|
| NO. | NAME | NO. | NAME1 | NAME2 | PHONE NUMBER | LINE | SPEED | LINE CONGESTION | CONTRACT | ASSOCIATED PROVIDER |
| 725 | | 1 | TOKYO | AP1 | 03-5732-2359 | ISDN | 128k | FIG. 6 | FIG. 7 | — |
| | | 2 | KANAGAWA | AP2 | 045-713-1356 | ISDN | 128k | : | : | |

FIG. 6

LINE CONGESTION (UNIT: 10%, 100% IN CONGESTION)

| DAY OF WEEK \ HOUR | 0 | 1 | 2 | 3 | 4 | 5 | 6 | ... | 22 | 23 | 24 |
|---|---|---|---|---|---|---|---|---|---|---|---|
| SUNDAY | 8 | 7 | 4 | 4 | 3 | 2 | 1 | ... | 4 | 4 | 2 |
| MONDAY | 1 | 1 | 1 | 0 | 0 | 0 | 0 | ... | 3 | 3 | 4 |
| ... | | | | | | | | | | | |
| FRIDAY | 5 | 2 | 1 | 1 | 0 | 0 | 0 | ... | 4 | 5 | 6 |
| SATURDAY | 8 | 6 | 3 | 2 | 2 | 2 | 2 | ... | 7 | 9 | 9 |

FIG. 7

CONTRACT INFORMATION

| PLAN | | FEE (YEN) | | | OPTION INFORMATION | |
|---|---|---|---|---|---|---|
| NO. | NAME | BASIC FEE | TIME | SURPLUS FEE | ASSOCIATED PHONE LINE | LINE DISCOUNT |
| 1 | PLAN A | 450 | 5 | 7/MINUTE | X COMPANY | 0 |
| 2 | PLAN B | 1700 | 15 | 3/MINUTE | X COMPANY | YEN 1/MINUTE |
| 3 | PLAN C | 2900 | 150 | 3/MINUTE | X COMPANY | YEN 2/MINUTE |
| 4 | PLAN D | 5000 | — | — | X COMPANY | 100% |

FIG. 8

AP INFORMATION SELECTED AT x-044 BY THE CENTER STATION OF THE X PHONE COMPANY

| PROVIDER | | ACCESS POINT | | | | | | OPTION INFORMATION | | |
|---|---|---|---|---|---|---|---|---|---|---|
| NO. | NAME | NO. | NAME1 | NAME2 | PHONE NUMBER | LINE | SPEED | LINE CONGESTION | CONTRACT | ASSOCIATED PROVIDER |
| 16 | ANET | 3 | KANAGAWA | KAWASAKI1 | 044-739-0003 | ANALOG | 56k | FIG. 6 | FIG. 7 | 57, 125 |
|  |  | 4 |  |  | 044-793-0001 | ISDN | 64k | … | … |  |
| 73 | BNET | 1 | KANAGAWA | KAWASAKI1 | 044-520-1000 | ANALOG | 56k | … | … | 7, 23, 91 |
|  |  |  |  |  |  | ISDN | 64k |  |  |  |
|  |  | 2 | KANAGAWA | KAWASAKI2 | 044-542-1001 | ANALOG | 33.6k |  |  |  |
|  |  |  |  |  |  | ISDN | 64k |  |  |  |
|  |  | 3 | KANAGAWA | KAWASAKI3 | 044-522-1002 | ANALOG | 56k |  |  |  |
|  |  |  |  |  |  | ISDN | 64k |  |  |  |
|  |  |  |  |  |  | ISDN | 128k |  |  |  |

FIG. 9

TOLL OF PUBLIC LINE (YEN/MINUTE)

| | EARLY MORNING 4:00~6:00 | DAYTIME 6:00~17:00 | NIGHT 17:00~23:00 | LATE NIGHT 23:00~4:00 |
|---|---|---|---|---|
| SAME AREA | 7 | 10 | 10 | 8 |
| ADJACENT AREA (UNTIL 20 KM) | 9 | 12 | 12 | 11 |

FIG. 10

INFORMATION ON DATABASE 29 OF PUBLIC PHONE OF X PHONE COMPANY

| PROVIDER | | | ACCESS POINT | | | | | OPTION INFORMATION | | TOLL (YEN/MINUTE) |
|---|---|---|---|---|---|---|---|---|---|---|
| NO. | NAME | NO. | NAME1 | NAME2 | PHONE NUMBER | LINE | SPEED | LINE CONGESTION | CONTRACT | ASSOCIATED PROVIDER | |
| 16 | ANET | 3 | KANAGAWA | KAWASAKI1 | 044-739-0003 | ANALOG | 56k | FIG.6 | FIG.7 | 57, 125, 725 | FIG.9 |
| | | 4 | KANAGAWA | KAWASAKI2 | 044-793-0001 | ISDN ANALOG ISDN | 64k 56k 64k | ... | ... | ... | ... |
| 73 | BNET | 1 | KANAGAWA | KAWASAKI1 | 044-520-1000 | ANALOG ISDN | 33.6k 64k | | | 7, 23, 91 | |
| | | 2 | KANAGAWA | KAWASAKI2 | 044-542-1001 | ANALOG ISDN | 56k 64k | | | | |
| | | 3 | KANAGAWA | KAWASAKI3 | 044-522-1002 | ANALOG ISDN ISDN | 56k 64k 128k | | | | |

LINE INFORMATION INSIDE MOBILE DEVICE

| PROVIDER | | | | ACCESS POINT | | | | OPTION INFORMATION | | | PUBLIC PHONE | |
|---|---|---|---|---|---|---|---|---|---|---|---|---|
| NO. | NAME | NO. | NAME 1 | NAME 2 | PHONE NUMBER | LINE | SPEED | LINE CONGESTION | CONTRACT | ASSOCIATED PROVIDER | TOLL (YEN/MINUTE) | COMPANY | LINE |
| 73 | B NET | 1 | KANAGAWA | KAWASAKI 1 | 044-520-1000 | ANALOG | 33.6k | FIG.6 | FIG.7 | 7, 23, 91 | FIG.9 | X COMPANY | ISDN 64k |
| | | | KANAGAWA | KAWASAKI 1 | | ISDN | 64k | .. | .. | | .. | | |
| | | 2 | KANAGAWA | KAWASAKI 2 | 044-542-1001 | ANALOG | 56k | .. | .. | | .. | | |
| | | | KANAGAWA | KAWASAKI 2 | | ISDN | 64k | .. | .. | | .. | | |
| | | 3 | KANAGAWA | KAWASAKI 3 | 044-522-1002 | ANALOG | 56k | .. | .. | | .. | | |
| | | | KANAGAWA | KAWASAKI 3 | | ISDN | 64k | .. | .. | | .. | | |
| 73 | B NET | 1 | KANAGAWA | KAWASAKI 1 | 044-520-1000 | ISDN | 128k | .. | .. | 7, 23, 91 | .. | Y COMPANY | ISDN 128k |
| | | | KANAGAWA | KAWASAKI 1 | | ISDN | 64k | | | | | | |
| | | 2 | KANAGAWA | KAWASAKI 2 | 044-542-1001 | ANALOG | 56k | | | | | | |
| | | | KANAGAWA | KAWASAKI 2 | | ISDN | 64k | | | | | | |
| | | 3 | KANAGAWA | KAWASAKI 3 | 044-522-1002 | ANALOG | 56k | | | | | | |
| | | | KANAGAWA | KAWASAKI 3 | | ISDN | 64k | | | | | | |
| | | | | | | ISDN | 128k | | | | | | |

FIG. 15

MOBILE COMMUNICATION    RETRIEVED RESULT 2002. 7. 7 (THURSDAY) 16:42
THE CURRENTLY COMMUNICABLE LINES ARE AS FOLLOWS.

CLICK THE FOLLOWING, THEN START TO CONNECT.

| IMPORTANCE ON TOLL | PUBLIC PHONE COMPANY NAME | X COMPANY |
|---|---|---|
| | LINE | ISDN |
| | SPEED | 64kbps |
| | TOLL | YEN 9/MINUTE |
| | PROVIDER NAME | B NET |
| | ACCESS POINT | 044-522-1000 |
| | LINE CONGESTION | 10% |
| IMPORTANCE ON SPEED | PUBLIC PHONE COMPANY NAME | Y COMPANY |
| | LINE | ISDN |
| | SPEED | 128kbps |
| | TOLL | YEN 17/MINUTE |
| | PROVIDER NAME | B NET |
| | ACCESS POINT | 044-522-1002 |
| | LINE CONGESTION | 0% |

FIG. 16

MOBILE COMMUNICATION    AUTOMATIC CONNECTION 2002. 7. 7 (THURSDAY) 16:42

SPECIFY THE FOLLOWING ITEMS AND CLICK [CONNECT], THEN AUTOMATICALLY RETRIEVE A LINE AND A PROVIDER ACCESS POINT AND START TO CONNECT.

| | |
|---|---|
| LINE | ISDN |
| SPEED | 64kbps |
| TOLL | YEN 9/MINUTE OR LESS |
| PROVIDER NAME | B NET |
| LINE CONGESTION | 10 % OR LESS |

[CONNECT]

COMMUNICATION SYSTEM

BACKGROUND OF THE INVENTION

The present invention relates to an improved communication system arranged to connect with the internet in the mobile environment. In particular, the present invention relates to the communication system which is arranged to communicate data between a mobile device and an access point of an internet provider through a wireless communication path between the mobile device and an instrument such as a public phone served as a contact point with the public line.

As the wireless communication technology, it is considered to use the Bluetooth (which is the inexpensive standards of the short-distance radio communication interface between the data and the voice through the use of the 2.4 GHz band) or a wireless LAN (which is the LAN standards of a short-distance wireless communication on the 2.4 GHz band).

Conventionally, in the case of executing the data communication in the mobile environment such as the outdoor like the office, in general, at first, a portable wireless phone such as a PHS (Personal Handyphone System) or a PDC (Personal Digital Cellular) is connected to the mobile device such as a notesized personal computer or a PDA (personal digital assistant). Then, the mobile device is served to dial an access point of the provider for accessing the internet or transferring electronic mails.

As the data communication method arranged to use a public phone, a public phone provided with an ISDN (Integrated Service Digital Communication Network) interface for data communication may be used for wired connection. In addition, another type of public phone provided with an IrDA (Infrared Data Association) port may be presented outdoor.

If not in the mobile environment, today, the LCR (Least Cost Routing) function may be used for the wired communication through the use of a wired phone line or the like. The LCR function is served to periodically transfer toll information of each phone company's line to a fixed phone with the LCR contract made and then to select the least inexpensive communication line based on the information. This LCR function is made available to the fixed (stationary) phone but not available to the mobile environment like the outdoor. That is, in the case of using the portable wireless phone such as the PHS or the PDC, for example, the LCR function is set so that no communication may be executed between the different wireless data communication carriers as in the case that the user uses the PDC made by the A company to access the base station of the B company. Nowadays, no choice is allowed from a plurality of carriers. This holds true to the IMT-2000 (International Mobile Telecommunications 2000).

As the prior art about the communication system in which a plurality of different communication paths are made available, there have been known the technologies in JP-A-9-172430 or JP-A-10-304071. In these prior arts, a plurality of wired communication circuits and a plurality of wireless communication circuits are provided in the communication system apparatus, which holds relevant data such as a transmission speed and a toll of each line so that the line may be automatically selected in accordance with the selected specifications inputted by the user.

Further, as another prior art, there have been known the technology in JP-A-2000-32047. This technology concerns with the mobile device (portable device) using the PHS as the communication means. The location information of each PHS is held in the PHS management center. The PHS management center operates to identify an area code of a public phone from the location information and to transfer this area code to the PHS. Then, the mobile device operates to automatically dial an access point of the provider with the most approximate specification on the basis of the content of the phone number list of all the access points of the connectable providers owned by the mobile device itself and the area code transferred from the management center.

The data communication through the use of the PHS or the PDC in the mobile environment of the foregoing prior art may use only the carrier of the PHS or the PDC used on the user's contract. At the contract time point of the PHS or the PDC, it is necessary to determine one carrier (of the communication company) to be used. The foregoing prior art allows a plurality of PHS or PDC carriers (communication companies) to be contracted. In this case, as the basic fee, the sum of the basic fees of the contracted carriers is required. The total cost is increased accordingly.

Afterwards, the deregulation of the communication results in increasing the number of new companies to be joined into the communication business, which may lead to the abrupt competition of tolls among the phone companies. Further, it is considered that the reduction or revision of the toll is frequently carried out. However, the foregoing prior art is required to determine the carrier (phone company) in the specification given when the PHS or the PDC is contracted. This makes it impossible to select a line at any place or time.

The foregoing LCR function is served to periodically transfer toll information of each company line to a fixed phone and select the least costly communication line based on the information. It cannot be used in the mobile environment like the outdoor as it is.

The prior arts disclosed in JP-A-9-172430 and JP-A-10-304071 are specified to have a plurality of wireless or wired communication devices. Hence, the user has to carry a plurality of wireless data communication devices. As mentioned above, the cost like the basic fees are increased. So are the overall weight of the devices carried by the user and the electronic power of the devices.

The prior art arranged to use the PHS disclosed in JP-A-2000-32047 is arranged to dial the nearest access point of the provider. As mentioned above, however, no choice of a low-toll line is allowed.

Moreover, the prior art arranged to use the public phone provided with the ISDN interface for data communication requires the user to connect the mobile device or the public phone through a cable at his or her own will and the user to search a proper access point of the provider and then dial it. The public phone provided with the IrDA port requires the user to move the mobile device in front of the public phone, make the IrDA port of the mobile device closer to the IrDA port of the public phone, and search the access point of the provider for dialing it. The both types of public phones burdens the user with a troublesome work.

SUMMARY OF THE INVENTION

It is an object of the present invention to provide a communication system which is arranged to retrieve a line-connecting carrier without the user's consciousness of it and automatically select the most approximate line or select the most approximate access point to the provider through the use of the wireless data communication in the mobile environment.

In carrying out the object in a preferred mode, the communication system arranged so that a portable computer having a communication function may use a public phone characterized in that the computer and the public phone provide a standard wireless data communication device, respectively, the computer obtains information of lines and information of contacts of internet providers from the public phone, the computer selects the most approximate line and contact point based on the information, the wireless data communication is executed between the computer and the public phone on the selected line and contact point, the public phone is connected with the connecting line of the internet provider, and the computer is connected with the internet.

The foregoing standard wireless data communication device may be the Bluetooth or the wireless LAN. The public phone carries out a protocol conversion between the standard wireless data communication and the phone line and then is connected with the access point of the provider through the phone line. The provider operates to transfer the access point information to the center station of the phone company through the phone line. Then, the center station of the phone company operates to select the effective access point information to each public phone and then transmit the access point information to each public phone. In a case that a portable computer served as the mobile station is located in the wireless data communication range of the public phone and the user tries to make access to the provider, the computer enables to automatically retrieve the communicable public phone, obtain the phone line information and the access point information from all the communicable public phones, select the most approximate public phone and access point, and connect to the selected ones.

According to the invention, the communication system is arranged to retrieve the line connecting carriers without the user's consciousness of it, and automatically select the most approximate line from the carriers or select the most approximate access point to the provider.

DETAILED DESCRIPTION OF THE EMBODIMENTS

Hereafter, the description will be oriented to a communication system according to an embodiment of the present invention.

Figure 1A:
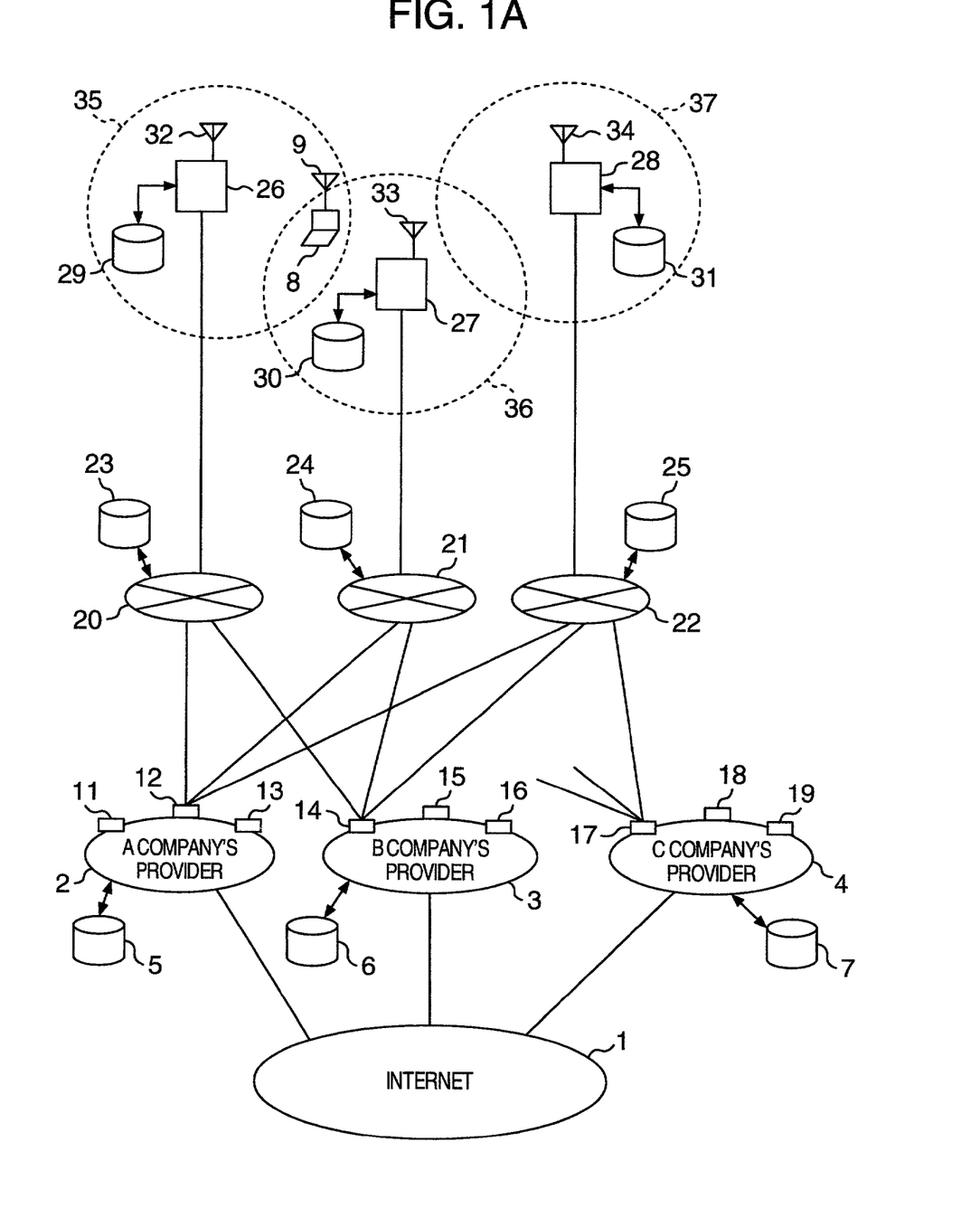
FIG. 1A is a block diagram showing an overall configuration of a communication system according to an embodiment of the invention.

FIG. 1A is a block diagram showing an overall arrangement of a communication system according to an embodiment of the present invention. In FIG. 1A, a numeral 1 denotes the internet. A numeral 2 denotes a provider of an A company. A numeral 3 denotes a provider of a B company. A numeral 4 denotes a provider of a C company. Numerals 5 to 7 denote databases (DBs) of a provider. A numeral 8 denotes a mobile device. Numerals 9 and 32 to 34 denote standard wireless data communication facilities. Numerals 11 to 19 denote a line access point (AP) of the provider. Numerals 20 to 22 denote line networks of the phone companies. Numerals 23 to 25 denote DBs of the center stations of the phone companies. Numerals 26 to 28 denote public phones of the phone companies. Numerals 29 to 31 denote DBs of the public phones of the phone companies. Numerals 35 to 37 denote standard wireless data communication ranges of the public phones of the phone companies.

Figure 1B:
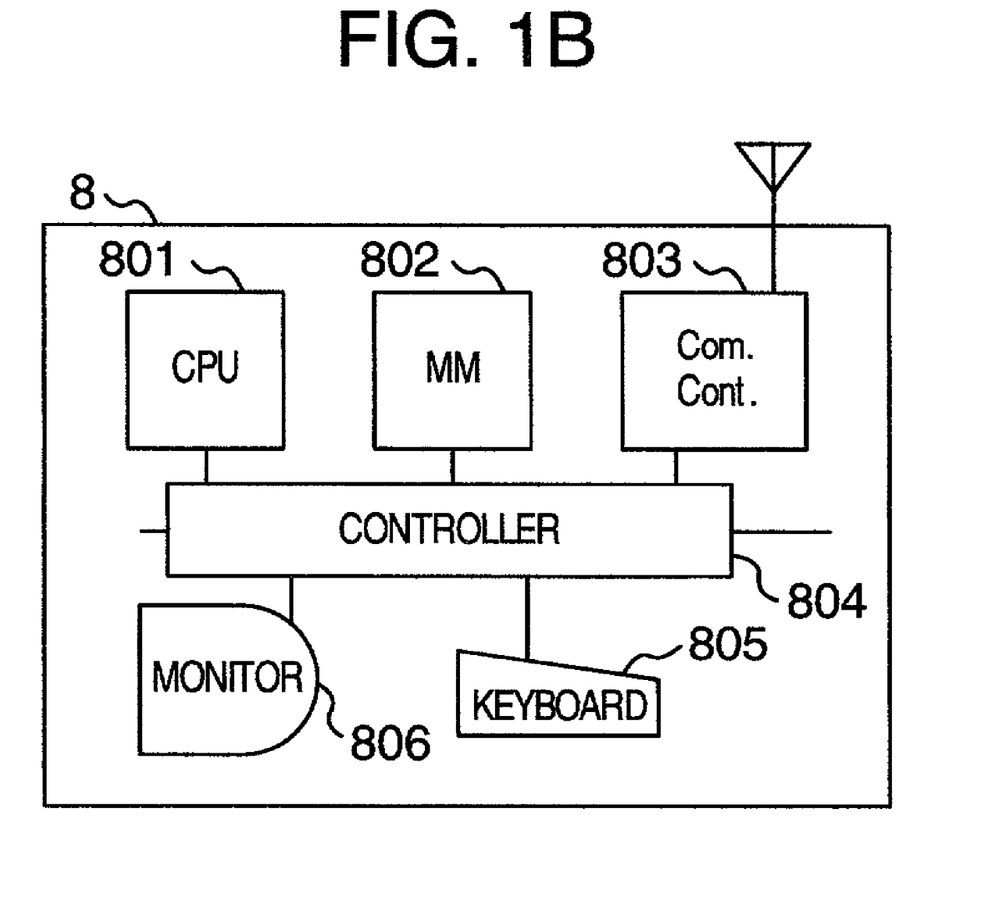
FIG. 1B is a block diagram showing an overall arrangement of a mobile device.

FIG. 1B shows an internal arrangement of the mobile device 8. The mobile device 8 includes a memory 802 for storing data or programs, a CPU 801 for executing programs and processing data, a monitor 806 for visually outputting the processed result of the CPU, a keyboard 805 by which an operation gives an indication or enters data, a controller 804 for transferring data or controlling the memory between the components, and a communication controller 803 corresponding to the foregoing wireless facility 9.

Though not shown, the public phone of each phone company, the host computer of the phone company for managing the DBs 23 to 25, and the server to be used by the provider for managing the AP information provide the same elements as shown in FIG. 1B, respectively. The operation of the software for executing the processing flow to be described in this embodiment makes it possible to fulfill their functions.

The communication system shown in FIGS. 1A and 1B includes a mobile device 8 like a portable computer having the standard wireless data communication facility 9 like the Bluetooth, a standard wireless data communication facility 32, the public phone of the X phone company having the DB 29, a standard wireless data communication facility 33, the public phone 27 of the Y phone company having the DB 30, a standard wireless data communication facility 34, and the public phone 28 of the Z phone company having the DB 31. The X phone company 26 is connected with the line network 20 of the X company. The public phone 27 of the Y company is connected with the line network 21 of the Y company. The public phone 28 of the Z company is connected with the line network 22 of the Z company. The center station of the public phone 26 of the X company includes the DB 23. The center station of the public phone 27 of the Y company includes the DB 24. The center station of the public phone of the Z company includes the DB 25. The A company provider 2 having the DB 5 and the APs 11 to 13, the B company provider 3 having the DB 6 and the APs 14 to 16, and the C company provider 4 having the DB 7 and the APs 17 to 19 are connected to the internet 1, in which the APs 11 to 19 are connected with the line networks 20 to 22 of those companies.

Figure 3:
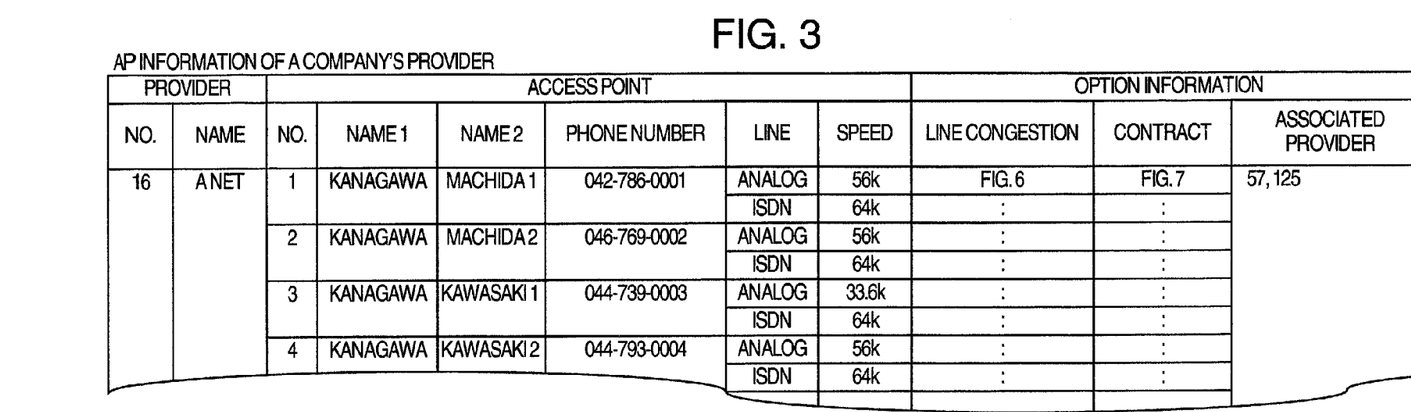
FIGS. 3 to 5 are tables showing an example of access point information owned by a provider.
Figure 4:
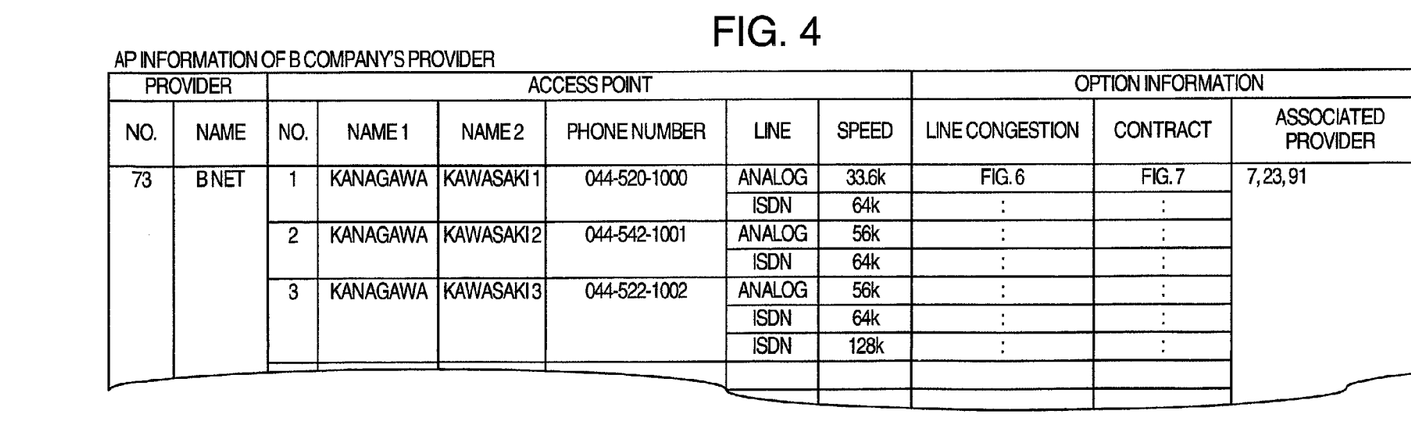
Figure 5:
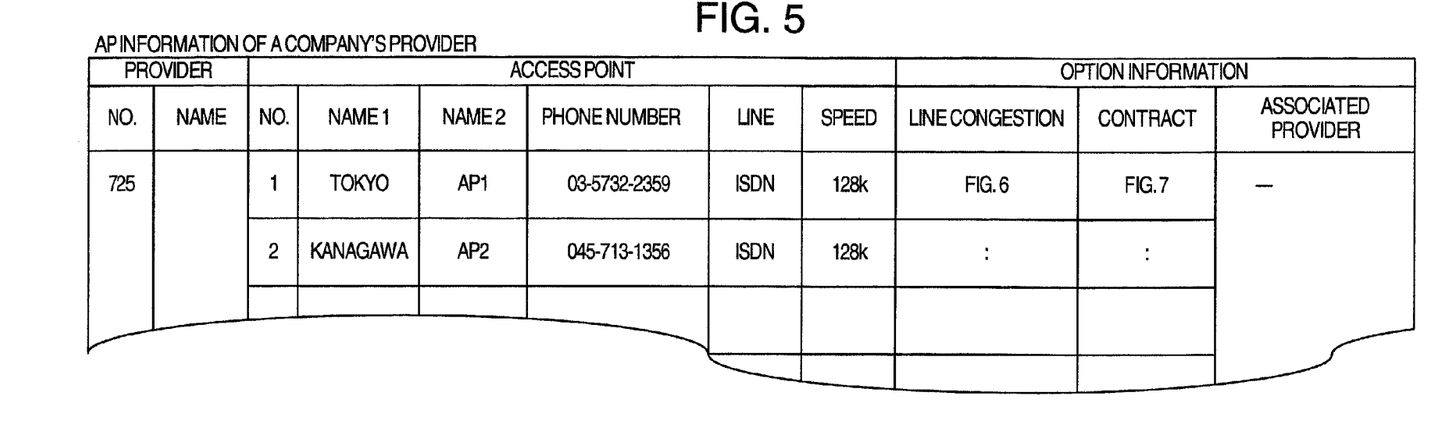
Figure 6:
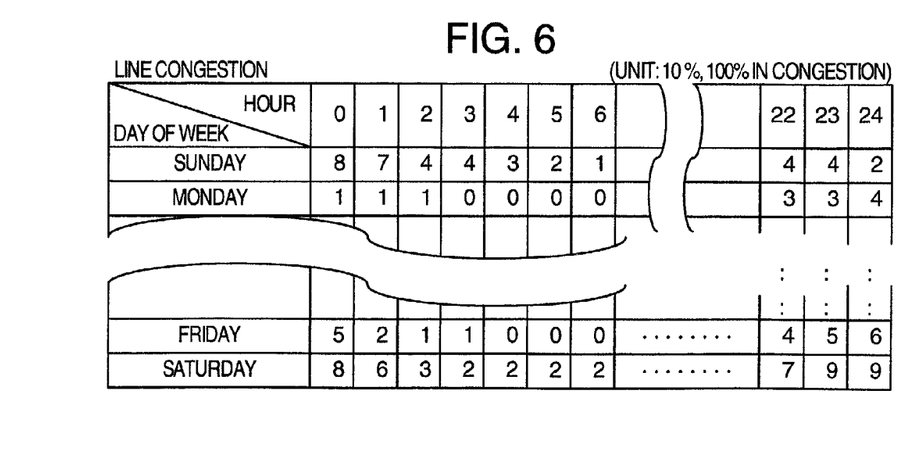
FIG. 6 is a table showing an example of information about line congestion that is option information of the access point information.

The company providers 2 to 4 include the information about the AP in the DBs 5 to 7, respectively. As shown in FIGS. 3 to 5, the DB of the AP information owned by the provider of the A, B and C companies includes a provider number and a provider name for identifying the provider itself, an ID number of the AP, a name of the AP, a phone number of the AP, a line type of the AP, a transmission speed of the AP, and option information such as line congestion information, contract information, and associated provider information. The provider number is used for identifying each company. Hence, it is preferable that the provider number is managed by a third authority so as not to be overlapped with another number. The AP number is managed by the provider of each company. The line congestion information means the congestion of the AP measured by each provider. For example, as shown in FIG. 6, the line congestion information should be gathered on each hour and day of the week. This AP information is periodically rewritten into the latest information by each provider.

Figure 7:
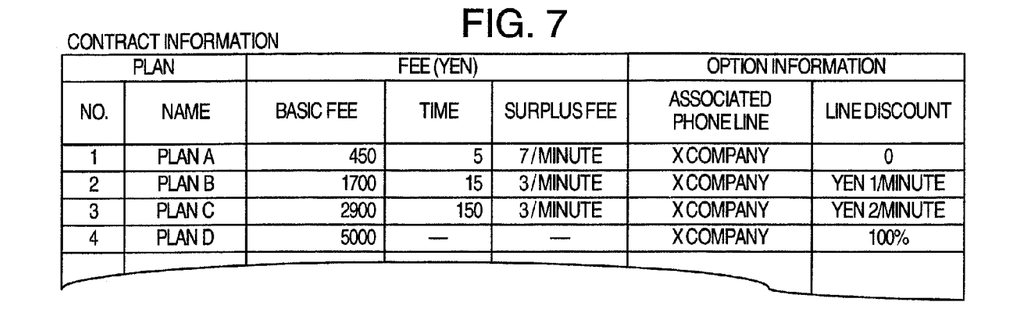
FIG. 7 is a table showing an example of contract information of a provider that is option information of the access point information.

As an example of the contract information, the example of the content of a service plan contracted by the provider and the user is shown in FIG. 7. In this example, the contract information includes a plan number and name for identifying a service plan, a basic fee for indicating a toll, a usable time of the basic fee, an additional fee of the surplus time, and the option information including an associated phone line and a line discount.

The information of the associated provider included in the AP information corresponds to the information of the associated provider. For example, the A net shown in FIG. 3 is tied up with the providers of the provider numbers 57 and 125.

Each provider operates to periodically send the AP information as shown in FIGS. 3 to 5 to the center station of each phone company through the lines 20 to 22 of the phone company. The AP information is held in the DBs 23 to 25 included in the center station of the phone company.

The center station of the phone company operates to transmit to the public phone the AP information having been sent from the provider. In a case that the center station transmits the AP information to the public phone, the center station may transmit all the information held thereby or selectively transmit the necessary information to the public phone.

Figure 2:
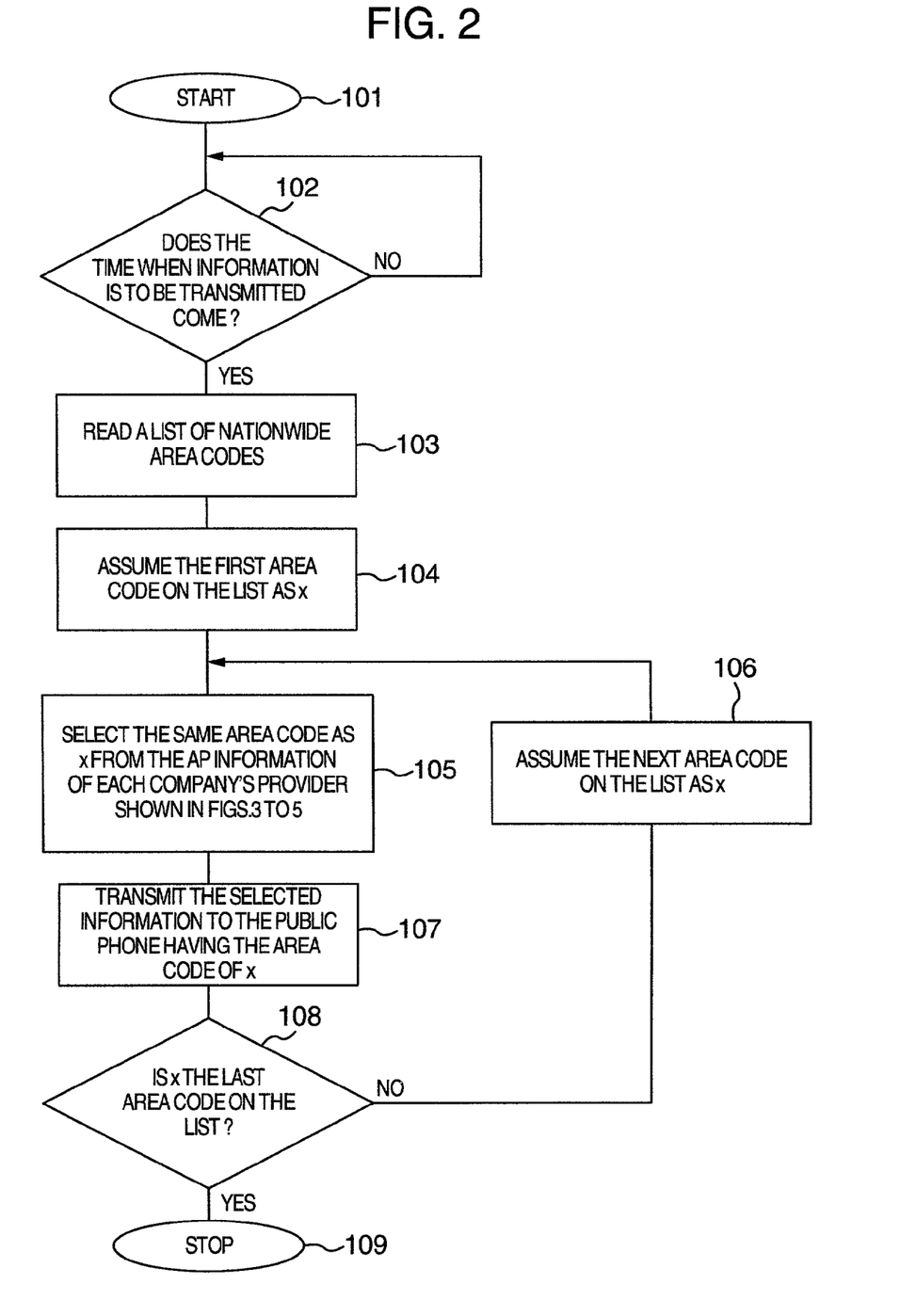
FIG. 2 is a flowchart for describing a processing operation of how a center station of a phone company selects access point information and transmits the information.

With reference to the flow shown in FIG. 2, the description will be oriented to the processing operation of how the center station of the phone company selects the necessary information to the public phone and transmits the selected information.

(1) The operation is executed to check if the time reaches the proper time when the information is to be transmitted. If not, the transmission is awaited until the proper time comes (steps 101 and 102). The center station of the phone company periodically transmits the information. However, too much frequent transmission of the information increases the traffics on the line, which brings about the large line congestion. Hence, this transmission should be executed at a frequency of once a week, for example.

(2) If the proper time when the information is to be transmitted comes at the step 102, the center station operates to read the list of the nationwide area codes held thereby, selects the area code in sequence from the first top area code of the list, and prepare transmission of the information with the area code as x (steps 103 and 104).

(3) The center station of each phone company operates to selectively extract the AP information corresponding to the area code assumed as x at the step 104 as the information to be sent to the public phone from the AP information of the provider of each company held in the DB 23 to DB 25 prepared in each station. For example, if x=044, the center station operates to select the AP information having '044' as the area code (step 105).

(4) The center station of the phone company operates to transmit the AP information selectively extracted at the step 105 to the public phone of the subject phone company having the area code x (step 107).

(5) Afterwards, the center station of the phone company operates to check if the area code x is the last one of the nationwide area code list. If no, the center station operates to repeat the process from the step 105 assuming that the next one of the area code list is x (steps 108 and 106).

(6) If the area code x is determined to be the last one of the nationwide area code list in the check of the step 108, it means that the transmission of all the AP information to the public phone is terminated. Hence, the process is terminated (step 109).

Figure 8:
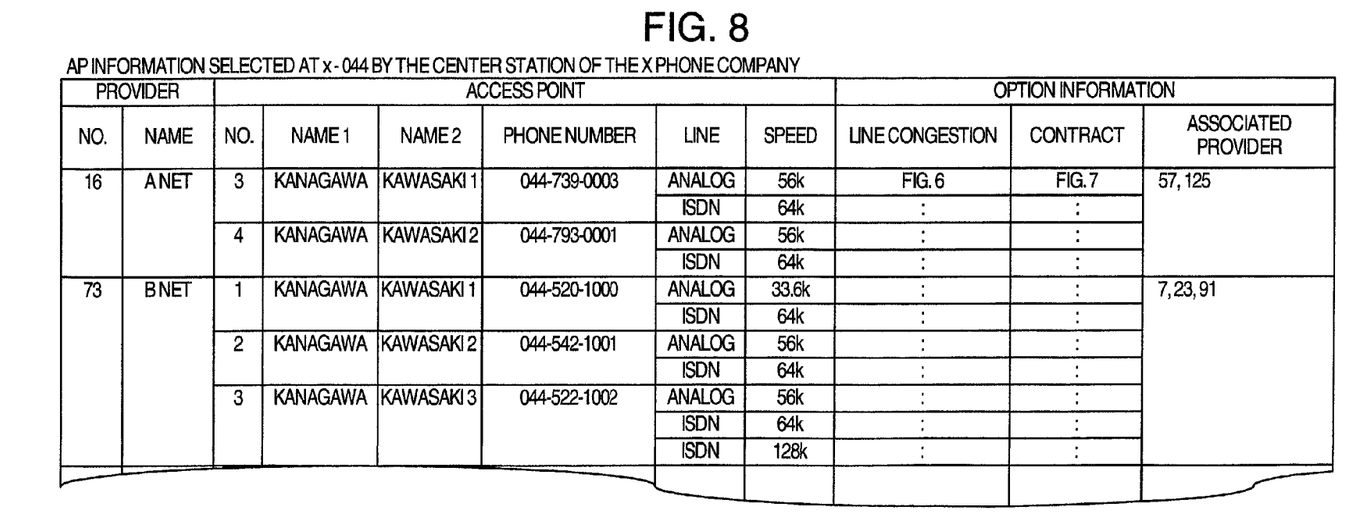
FIG. 8 is a table showing an example of the result of the access point information selected and transmitted by the process of FIG. 2.

In the foregoing process, if the center station of the phone company X selects the AP information from the AP information of the provider of each company shown in FIGS. 3 to 5 with the area code as x=044, the AP information is selected as shown in FIG. 8, and then the AP information is transmitted to the public phone of the area code 044.

In the foregoing description of the process, the center station operates to select the AP information having the area code x and then transmit the public phone of the area code x. In place, the center station may select the AP information having the area codes (x−1) to (x+1) and then transmit the information to the public phone of the area code x. Further, since the area codes of the adjacent areas may not be necessarily ranged in sequence, the specific area codes may be combined with each other before transmitting the information.

The public phone, which is inputted with the AP information of each provider selected as mentioned above, the AP information being transmitted from the center station of the phone company, operates to add the toll information to the AP information as shown in FIG. 8. The toll information is transmitted to the public phone together with the AP information or separately from the center station of the phone company. For example, it is assumed that the public phone 26 of the X phone company shown in FIG. 1 has an area code of 044, the center station of the X phone company transmits the AP information of the provider as shown in FIG. 8 to the public phone 26, and then the AP information is stored in the DB 29.

Figure 9:
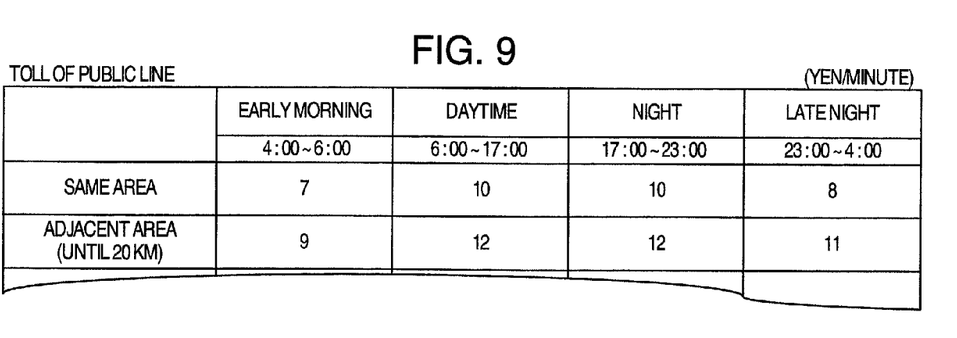
FIG. 9 is a table showing an example of a toll list of a public phone line.
Figure 10:
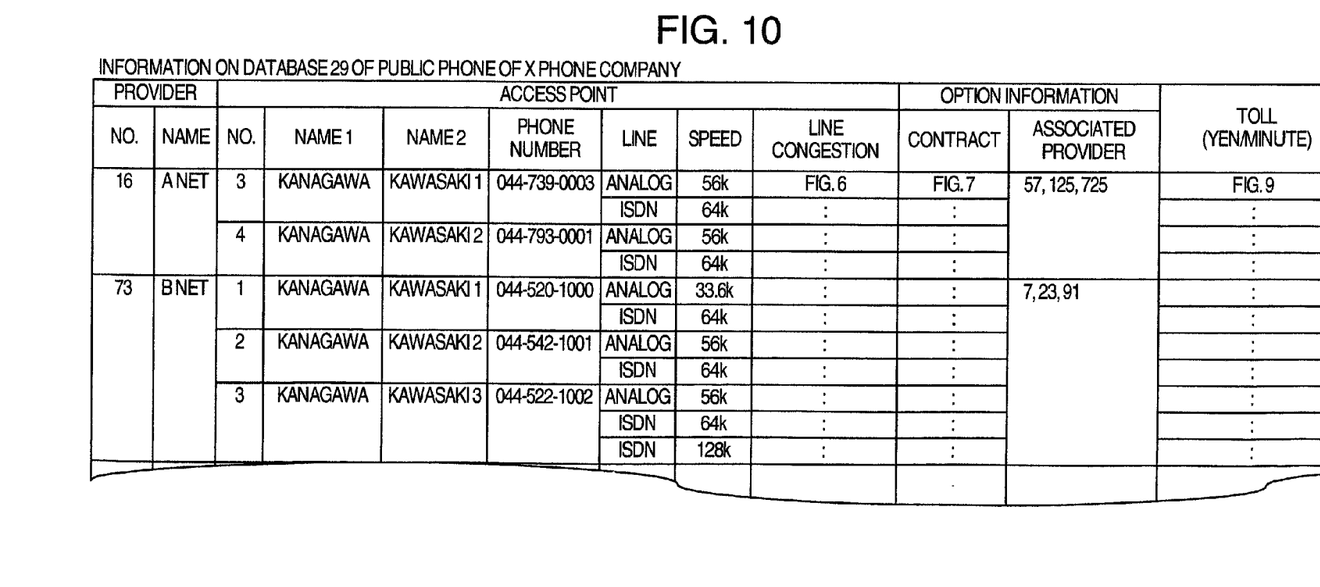
FIG. 10 is a table showing an example of line information held in the public phone.

In this assumption, the public phone 26 of the X phone company includes in the DB 29 the toll taken when the public phone of the subject company accesses the phone number of each AP information as shown in FIG. 8 as the toll list of the subject phone company as shown in FIG. 9. The public phone 26 operates to extract from this toll list the toll taken in accessing the phone number of each AP information shown in FIG. 8 and then add this toll information to the information shown in FIG. 8. As this result, the public phone 26 operates to hold in the DB 29 the information as shown in FIG. 10 as the line information to which this toll information is added.

Like the foregoing description, the public phone 27 of the Y phone company, which is inputted with the AP information transmitted from the center station of the Y phone company, includes the addition of the AP information into the toll information. Moreover, the public phone 28 of the Z phone company, which is inputted with the AP information transmitted from the center station of the Z phone company, includes the addition of the AP information to the toll information. In this state, the public phone of each phone company includes the AP information, the transmission speed, the type, the line congestion, the contract information, the associated (tie-up) provider information, and the toll information of the same area of each company's provider as shown in FIG. 10.

The public phones 26 to 28 provide the standard wireless data communication facilities 32 to 34, respectively. The public phones 26 to 28 may communicate with the mobile device 8 having the standard wireless data communication facility 9 in the standard wireless data communication ranges 35 to 37 through the use of the standard wireless data communication facilities 32 to 34, respectively.

Figure 11:
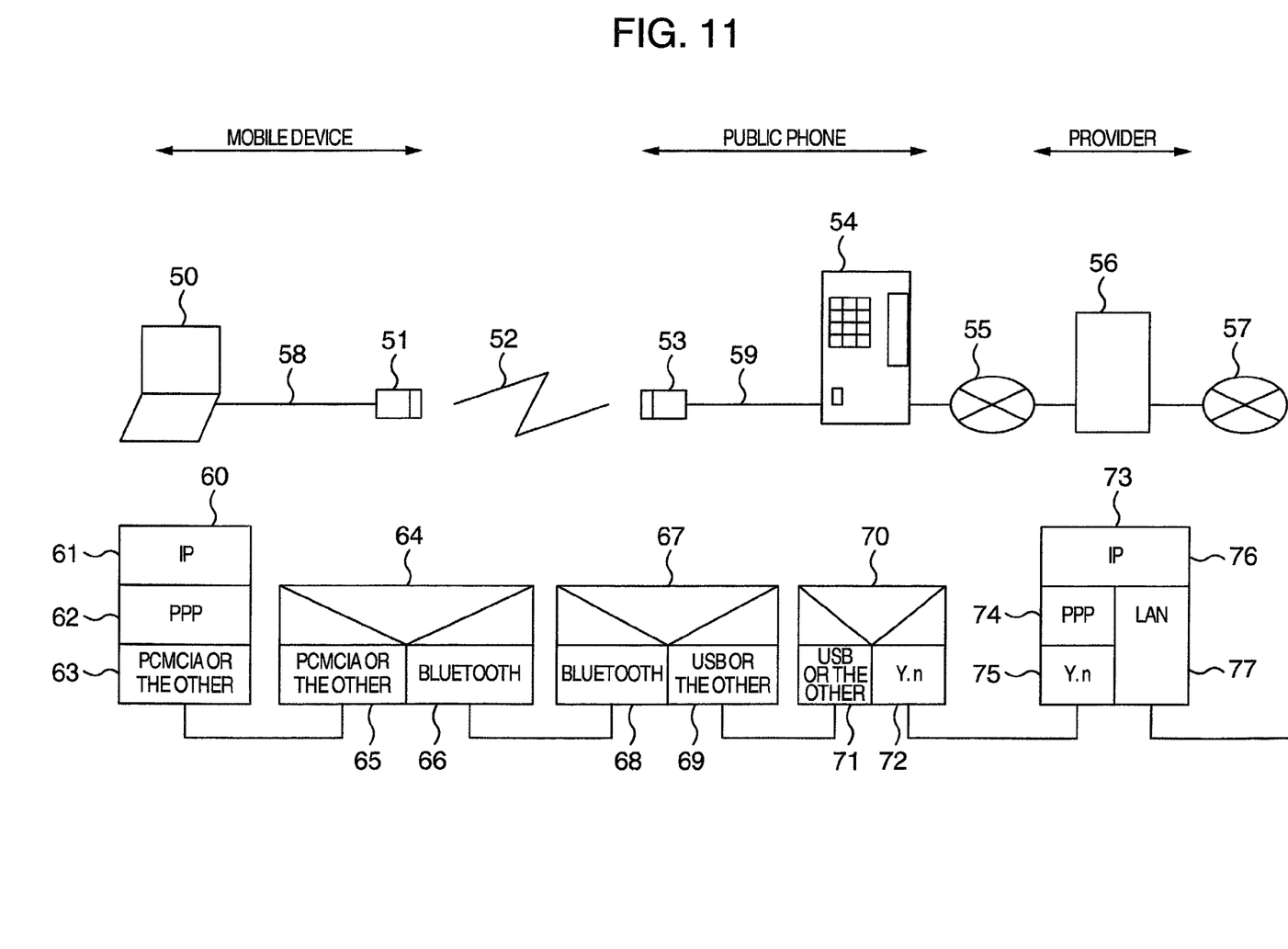
FIG. 11 is a block diagram for describing an overall arrangement of a communication system and a network hierarchy according to an embodiment of the present invention.

FIG. 11 is a diagram showing a connection/network hierarchy from the internet to the mobile device, partially extracted from the overall arrangement of the communication system shown in FIG. 1. FIG. 11 shows the communication protocol in the case that the Bluetooth are used as the standard wireless data communication facilities 32 to 34. Hereafter, this arrangement will be described below. FIG. 11 is a block diagram showing each device and the communication method in the upper portion of FIG. 11 and the communication protocol corresponding thereto in the lower portion of FIG. 11.

In FIG. 11, a numeral 50 denotes a mobile device. Numerals 51 and 53 denote the Bluetooth modules. A numeral 52 denotes a wireless data communication path. A numeral 54 denotes a public phone. A numeral 55 denotes a phone line. A numeral 56 denotes a dial-up router. A numeral 57 denotes the internet. A numeral 58 denotes a PCMCIA interface. A numeral 59 denotes a USB interface. A numeral 60 denotes a network hierarchy of the mobile device. A numeral 61 denotes a network layer IP of the mobile device. A numeral 62 denotes a data link layer PPP of the mobile device. A numeral 63 denotes a physical layer PCMCIA of the mobile device. A numeral 64 denotes a network hierarchy of the Bluetooth module. A numeral 65 denotes a physical layer PCMCIA of the Bluetooth module. Numerals 66 and 68 denote physical layers (wireless) of the Bluetooth module. A numeral 67 denotes a network hierarchy of the Bluetooth module. A numeral 69 denotes a physical layer USB of the Bluetooth module. A numeral 70 denotes a network hierarchy of the public phone. A numeral 71 denotes a physical layer USB of the public phone. A numeral 72 denotes a physical layer V.n of the public phone. A numeral 73 denotes a network hierarchy of the dial-up router. A numeral 74 denotes a data link layer PPP of the dial-up router. A numeral 75 denotes a physical layer V.n of the dial-up router. A numeral 76 denotes a network layer IP of the dial-up router. A numeral 77 denotes a data link layer/physical layer LAN of the dial-up router.

The mobile device 50 shown in FIG. 11 is connected with the Bluetooth communication module 51 through the interface 58 of the PCMCIA (Personal Computer Memory Card International Association) standards. The communication protocol 60 of the mobile device 50 uses an IP (Internet Protocol) for the network layer 61, a PPP (Point-to-Point Protocol) for the data link layer 62, and a PCMCIA for a physical layer 63. This kind of protocol is just exemplary. In place, the communication protocol 60 may use Mobile IP or Ipv6 (IP Version 6) for the network layer 61, and a USB (Universal Serial Bus) for the physical layer 63. The data from the mobile device 50 is converted into the wireless data communication signal in the Bluetooth module 51 and then is converted into the USB signal in the Bluetooth module 53 on the side of the public phone 54.

In the embodiment shown in FIG. 11, the public phone 54 and the Bluetooth module are connected through the USB interface 59. In place, the PCMCIA or another interface may be used. In actual, it is practical that the Bluetooth module is built in the public phone 54. The public phone 54 includes a circuit for converting the signal of the USB into a phone line signal.

In the embodiment shown in FIG. 11, the public phone 54 includes a modem function of the analog line and the phone line 55 is an analog line. The line may be the ISDN, the ADSL, the CATV or the like in place of the analog line. The V.n72 shown in FIG. 11 is the analog modem standards. It may be V.90 (56 kbps). The public phone 54 is connected to the dial-up server 56 of the provider through the public line 55. The dial-up server 56 performs a password authentication protocol through the PPP protocol of the data link layer 74 for the purpose of authenticating the user of the password. Then, the dial-up server 56 is LAN-connected with the internet 57. The method of authenticating the user is the same as the commonly available method used in the existing dial-up connection.

Figure 12:
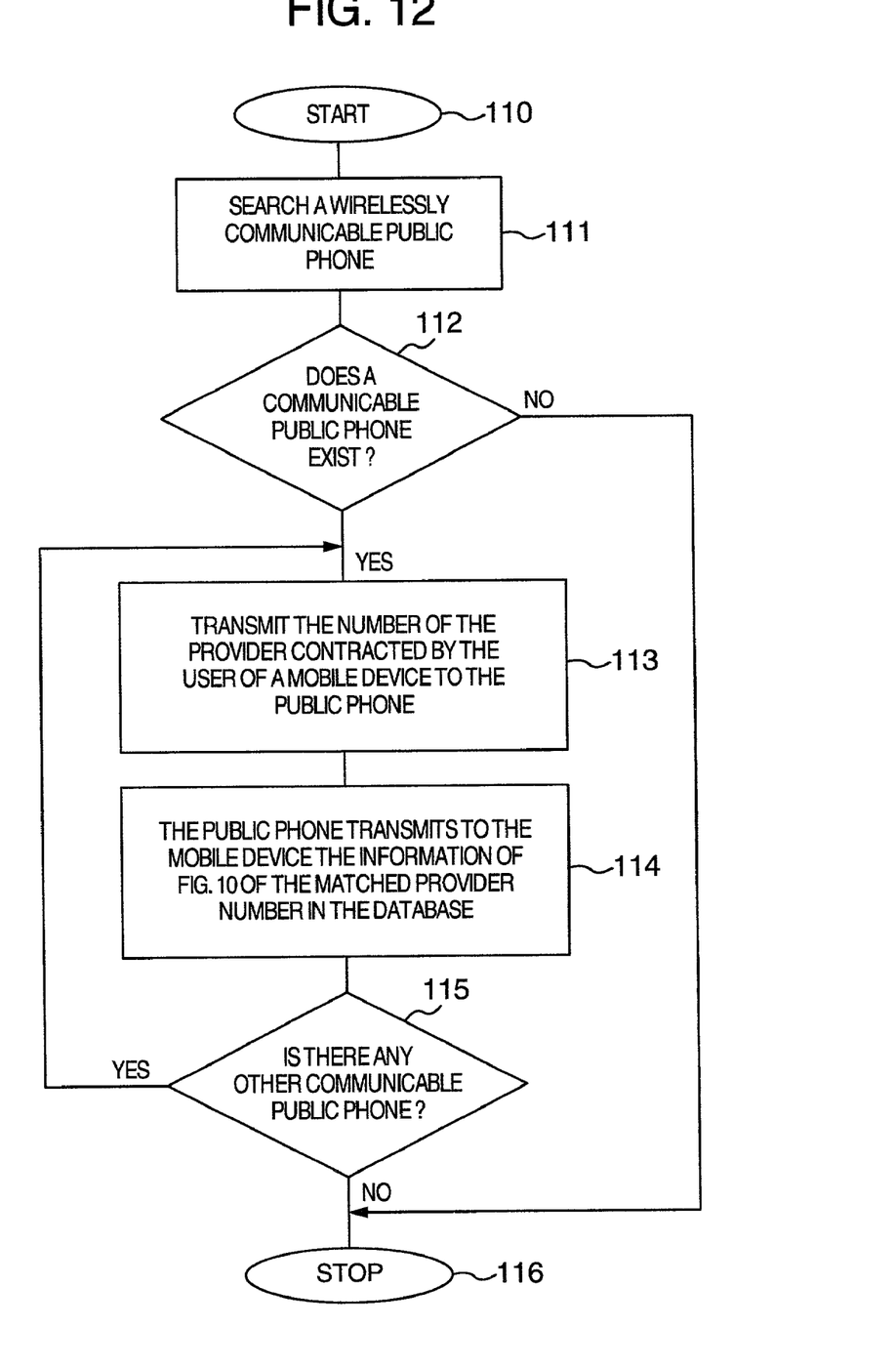
FIG. 12 is a flowchart for describing a processing operation of how the mobile device obtains information from the public phone.

In turn, the description will be oriented to the processing operation of how the AP information (shown in FIG. 10) of the provider is transferred between the mobile device 8 shown in FIG. 1 and the public phones 26 to 28 with reference to the flow shown in FIG. 12. The mobile device 8 and the public phones 26 to 28 include the communication programs for executing this process, respectively. This program may be executed intentionally or be automatically and periodically executed between the mobile device 8 and the public phones 26 to 28 when the mobile device 8 enters into the wireless data communication ranges 35 to 37 like the wave receipt level of the portable phone even if the user is aware of it.

(1) When the program is started, the mobile device 8 operates to search the public phone that may provides a capability of wirelessly communication data. In the embodiment shown in FIG. 1, the mobile device 8 enables to communicate the public phone 26 of the X phone company with the public phone 27 of the Y company and check if the communicable public phone is found. If not found, the program is terminated. (steps 110 to 112).

Figure 14:
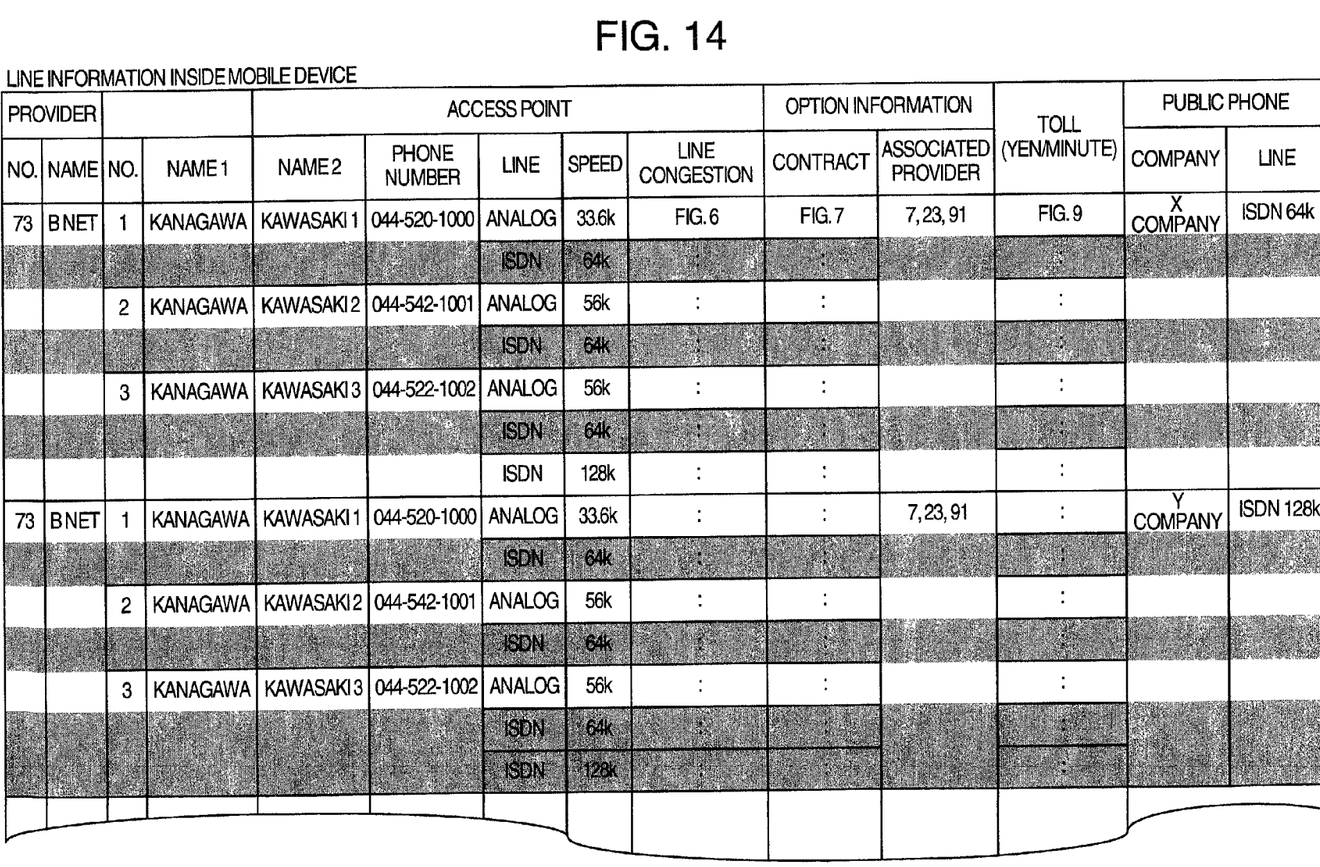
FIG. 14 is a table showing an example of line information obtained by the mobile device.

(2) If a communicable public phone is found in the check of the step 112, the mobile device 8 operates to transmit the information of the provider contracted by the user carrying the mobile device itself to the public phone and requests the public phone to transmit the AP information of the provider. The information of this provider may be the name of the provider or the number thereof. For example, in FIG. 1, if the user of the mobile device 8 contracts with the provider of the B company, as shown in FIG. 14, the B net or No. 73 is notified to the public phone (step 113).

(3) As a result, the public phones 26 to 27 to be communicated with the mobile device 8 operate to extract only the information of the provider of the B company from the provider information (see FIG. 10) carried in the public phones and then give back the extracted information to the mobile device 8. The mobile device 8 receives the AP information transmitted from the public phones 26 and 27 (step 114).

(4) It is checked if another communicable public phone still exists. Then, if two or more idle public phones are found, the mobile device 8 operates to transfer the provider information of the B company with another public phone in sequence. In the embodiment shown in FIG. 1, since the mobile device 8 stays in the communicable range with the public phones of the X phone company and the Y phone company, the mobile device enables to obtain the information as shown in FIG. 14 (step 115).

The user of the mobile device 8 selects one AP from the obtained provider information and communicate data at the AP. At this time, the line of the public phone, that is, the type of the line 55 shown in FIG. 11 limits the AP of the provider. In the embodiment shown in FIG. 14, the public phone line of the X phone company is the ISDN 64 kbps and the public phone line of the Y phone company is the ISDN 128 kbps. The AP is required to comply with this type of line. In this case, only the data shown in the half-tone dot meshing portion may be selected as effective information. Hence, if the public phone sends the AP information to the mobile device, it is possible to send only the effective information shown in the half-tone dot meshing portion shown in FIG. 14.

If no AP of the provider contracted by the user is found, the public phone enables to transmit the information of the associated provider from the associated provider information. For example, if the user make a contract with the provider of the C phone company, as shown in FIG. 5, the public phone is the provider No. 725 of the C phone company and operates to transmit to the mobile device the A net information of the provider No. 16 shown in FIG. 10 including the item No. 725 of the associated provider in the information shown in FIG. 10 carried in the public phone. In addition, even if an AP of the provider contracted by the user is found, by referring to the associated provider information, it is possible to transmit the AP information of the associated provider.

In the foregoing process, the process of how the mobile device searches the public phone to wirelessly communicate data is executed by the detection of the radio signal issued by the public phone in the mobile device. The service information to be notified to lots of unspecific users is put on the radio signal issued by this public phone. This makes it possible for the user to view various kinds of information from the phone company at this point.

Figure 13:
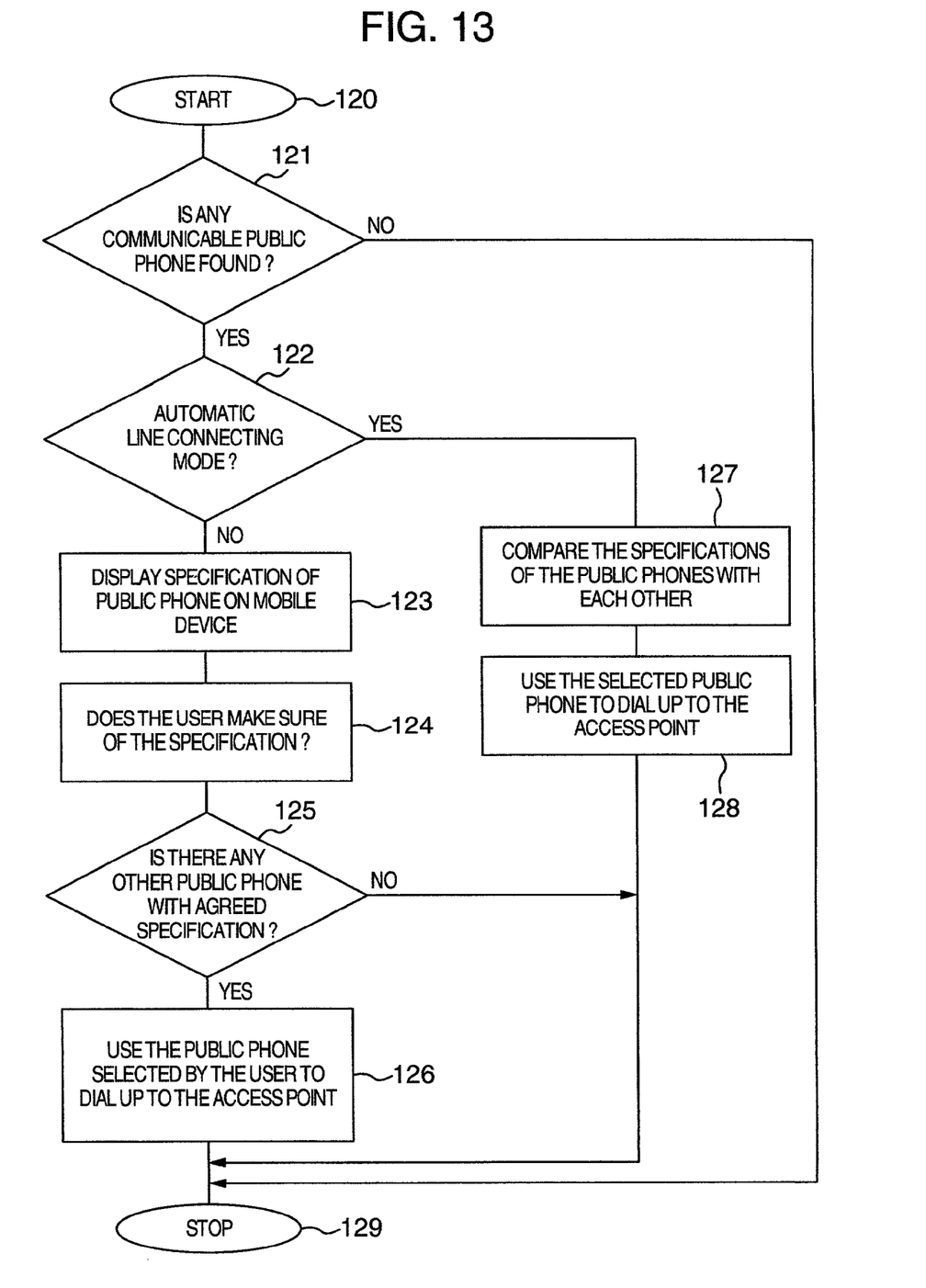
FIG. 13 is a flowchart for describing a processing operation of how the mobile device selects a well-specified line.

In turn, the description will be oriented to the processing operation of how the mobile device 8 selects a proper public phone from the foregoing information and is connected to the AP with reference to the flow of FIG. 13. The program for executing this process is started when the program of obtaining the line information described with reference to FIG. 12 is completed. If a communicable public phone is found, the line selection and the connection are executed. The user has to determine the connecting mode on the program of the mobile device in advance. This mode may be an automatic line connecting mode or a manual line connecting mode. In a case that the mode is set to the automatic line connecting mode, if any communicable line exists and the specification set by the user in advance is met, the connection is automatically executed. The setting specifications are an allowance of the toll, an allowance of the line congestion, a transmission speed, a time, and so forth. If the mode is set to the manual line connecting mode, the user makes sure of the specification of the public phone before performing the connection.

(1) When this processing program is started, the mobile device 8 operates to check if a communicable public phone is found. If no, the process is terminated. If yes, it is checked if the connecting mode is set to the automatic line connecting mode (steps 120 to 122).

(2) If the mode is set to the automatic line connecting mode at the step 122, the mobile device 8 operates to compare the information (see the half-tone dot meshing of FIG. 14) of one connectable line with the information of another, select the well-specified line, and dial up to the AP with the selected public phone.

Figure 16:
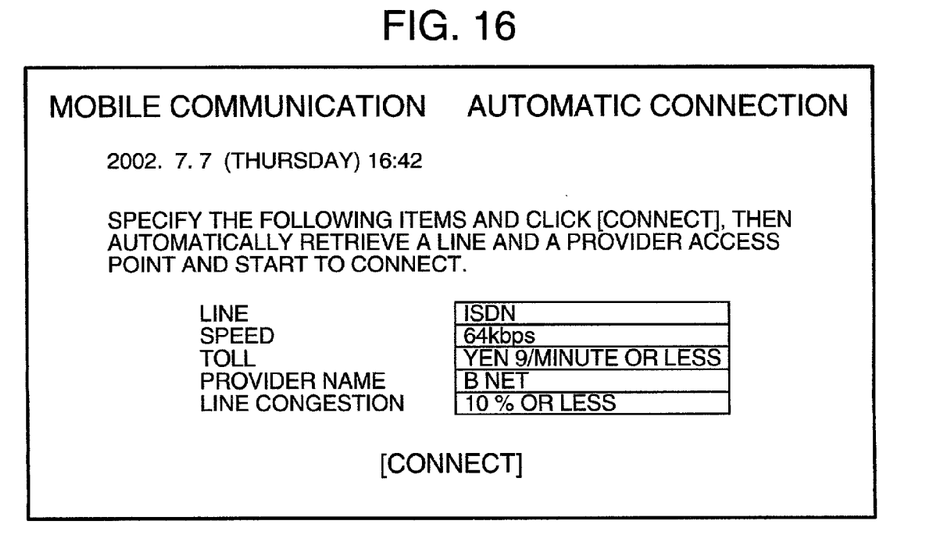
FIG. 16 is a view showing an example of a display screen in the case that the mobile device automatically selects the line.

In the case of this automatic line connecting mode, when the connection is started, as shown in FIG. 16, the checking screen may be displayed (steps 127 and 128).

The line type, the transmission speed, the toll, the provider, and the line congestion on the checking screen shown in FIG. 16 are used as the setting screen on which the user may input the data into the mobile terminal. The specification required by the user may be inputted to the mobile terminal from this screen. In this case, as a possible operation, if a communicable public phone is found, the specification requested by the user, inputted on the setting screen, is transmitted to the public phone. Then, the public phone searches the AP that meets this specification and automatically dials up to the AP, and then starts the line connection. When the public phone obtains the provider information and the user-requested specification from the mobile device (for example, the provider name 73 (B net), the line ISDN, the speed 64 kbps, the line congestion 10% or less, the toll 9 yen a minute or less), the public phone operates to select the provider that meets this specification from the DB (see FIG. 10) carried by itself and automatically dials up to the provider. In a case that the connecting mode is set to the automatic line connecting mode at which the connection is automatically determined, since no AP information is found inside the mobile device, the operation shown in FIG. 12 is not required. If two or more communicable public phones are found, it is necessary to request one public phone to do connection without having to transmit the request for connection to two or more public phones at a time. Moreover, the specification shown in FIG. 16 may be pre-stored in the mobile device without having to input it each time. This specification may be read on this setting screen. In this state, the user may start to perform the connection if the specification is met (transformation of the steps 127 and 128).

Figure 15:
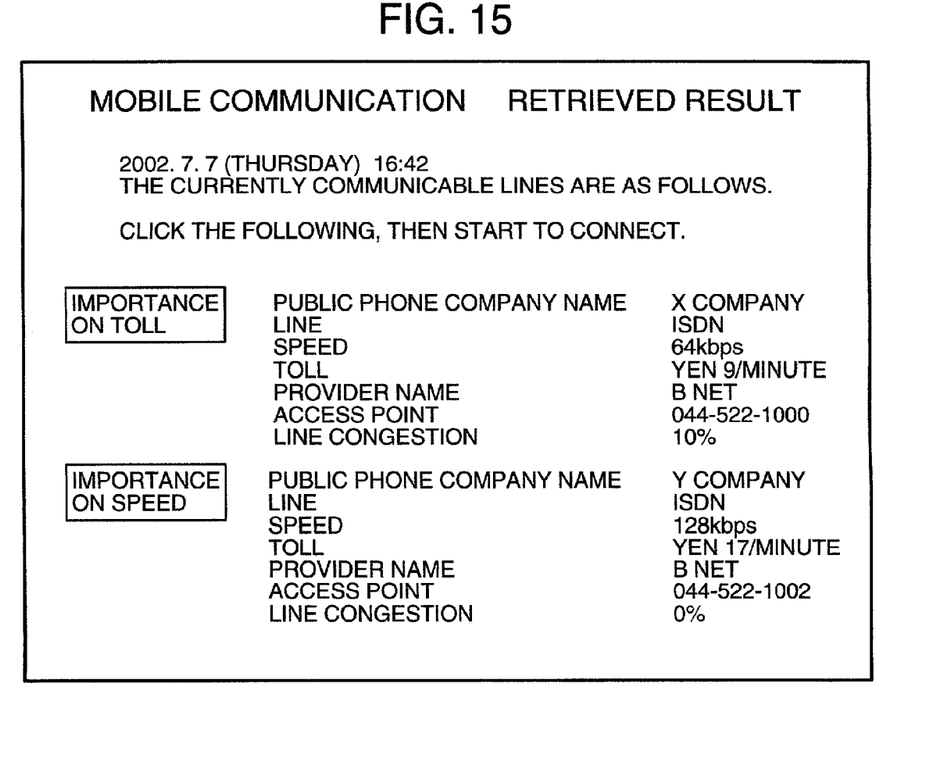
FIG. 15 is a view showing an example of a display screen appearing in the case that the mobile device selects the line.

If the mode is not set to the automatic line connecting mode at the step 122, if the line connection is manually executed, the specification of the public phone as shown in FIG. 15 is displayed on the mobile device. The user makes sure of this specification. Then, if the user would like to perform the connection, the connection to the AP is started through the public phone selected by the user (steps 123 to 126).

Ordinarily, in the case of dialing up to the internet through the provider, the user makes a contract with the provider and the contracted provider charges the toll for the user. Also in the embodiment of the present invention, the similar method is used for payment of the toll. The toll is calculated from a product of the toll and the time of use and the fee is paid by the provider to the phone company. Then, the total amount of the internet connecting fee to be ordinarily paid by the user to the provider and the toll corresponds to the amount billed by the provider to the user. This method does not require the user to make contracts with two or more phone companies. It requires the user to merely make a contract with the provider.

In the foregoing embodiment of the invention, the ID number of the business owner is not assigned to the phone number of the public phone. The public phone merely includes a number like 044-XXX-XXXX. However, if necessary, the ID number of the business owner may be added to the top of the area code. The present invention may be applied to this case.

In the foregoing embodiment of the invention, the connection of the mobile device to the public phone may hold true to the connection of the mobile device to the public phone provided with the ISDN interface or the IrDA interface of the prior art. However, the prior art in which the connection is executed through the ISDN or the IrDA requires the user to move to the public phone to be connected to the mobile device and intentionally select the public phone. Further, the user has to search the phone location and the connecting AP number. If the wireless interface is in use, unfavorably, the user disables to search the connectable public phone.

The foregoing embodiment of the present invention is arranged to use the wireless device such as the Bluetooth or the wireless LAN. This embodiment has a shorter wave propagation distance than the existing PHS or PDC. In particular, it is practical enough to use this embodiment in a crowded public place like an airport lobby and a hospital waiting room when accessing the internet, downloading various kinds of data, and transferring an electronic mail through the use of the wireless data communication technology.

Moreover, the needs of downloading multimedia data or application software such as music or motion pictures will be easily on the rise in near future. In order to correspond with these needs, it is necessary to improve the transmission speed. In the foregoing embodiment of the present invention, since the Bluetooth or the wireless LAN is relatively fast even in the current state, what is required is only to make the wired portion of the public phone line of a fast optical fiber cable. This is technically easier than the increase of the speed in the wireless system such as the PHS, the PDC or the IMT-2000. Moreover, today, the optical fiber cable comes to a telephone pole near the house. The use of the optical fiber thus makes it possible to implement the embodiment far more inexpensively than the installation of the base station of the IMT-2000.

According to the foregoing embodiment of the invention, it is possible to use the wireless data communication in the mobile environment, search the line connecting carrier without the user's consciousness of it, and automatically select the line with the most approximate specification. Further, the most approximate AP of the provider may be automatically selected.

It is presumed in future that the Bluetooth and the wireless LAN is mounted onto the mobile device and the Ipv6 (IP Version 6) to be switched worldwide may provide various kinds of electric products with their own IP addresses in connecting them to the network. It is practicable to mount the Bluetooth onto the public phone with the IP address. The embodiment of the present invention makes it possible for the mobile PC to automatically select the connecting target. Moreover, the embodiment also makes it possible to search the well-specified inexpensive line in the mobile environment like the outdoor and to simply connect to the internet or accept various kinds of services from the provider.

What is claimed is:

1. A communication system having a portable computer provided with a communication function, for enabling said computer to communicate data through a public phone, comprising:

said computer having a standard wireless data communication device;

said public phone having a standard wireless data communication device; and a database provided in each carrier of said public phone and storing connection information from said public phone to a plurality of internet providers;

wherein when said computer is connected to said public phone, said computer obtains connection information from said database provided in the carrier of said public phone as to connected public phones to obtain best-suited carrier lines and providers, and to determine a public phone and a service provider to be connected, for connecting said computer with the internet.

2. A communication system as claimed in claim 1, wherein said connection information includes a line type, a transmission speed of the line, a toll, a phone number of the contact point of the internet provider, a transmission speed of a connecting line, a type of a connecting line, a line congestion, information about a contract, and information about one or more internet providers associated with said internet provider.

3. A communication system as claimed in claim 1, wherein said internet provider operates to transmit to a center station of a phone company a phone number of the contact point of the internet provider, a transmission speed of a connecting line, a type of a connecting speed, a line congestion, information about a contract, and information about one or more internet providers associated with said internet provider, and said phone company operates to classify the information according to each area code and add the line type of the public phone, a transmission speed of the line, and a toll to said classified information and then transmit the resulting information to said public phone.

4. A method of connecting with an access point of an internet provider through a wirelessly communicable public line connecting device for connecting a mobile terminal provided with a wireless communication unit with a public line connected to said wirelessly communicable public line connecting device, comprising the steps of:

storing connection information, as to said public line, of said internet provider to be connected, in a database provided in each carrier of said wirelessly communicable public line connecting device;

enabling said mobile terminal to detect said wirelessly communicable public line connecting device; and obtaining said stored connection information and line information of said internet provider from said detected wirelessly connected public line connecting device, so as to obtain best-suited carrier lines and internet providers, and to determine a wirelessly communicable public line connecting device and an internet provider to be connected, for connecting said mobile terminal with the internet.

5. A method as claimed in claim 4, wherein said connection information of said internet provider includes access point information, and said method further comprises the step of visually outputting said connection information of said internet provider to the user of said mobile terminal.

6. A method as claimed in claim 4, further comprising the step of connecting said mobile terminal with an access point of said internet provider via said wirelessly communicable public line connecting device detected by said mobile terminal.

7. A method as claimed in claim 4, further comprising the step of obtaining toll information of said wirelessly communicable public line connecting device through said mobile terminal.

8. A method as claimed in claim 7, further comprising the step of visually outputting the connection information and the toll information to the user of said mobile terminal.

9. A method as claimed in claim 7, further comprising the step of connecting an access point selected through the wirelessly communicable public line connecting device in accordance with the connection information and the toll information.

10. A method as claimed in claim 4, wherein the step of obtaining the stored connection information includes the substeps of:

enabling said mobile terminal to provide said wirelessly communicable public line connecting device with information for specifying one internet provider;

retrieving an access point corresponding to the information for specifying the internet provider received by said wirelessly communicable public line connecting device; and transmitting said retrieved access point to said mobile terminal.

\* \* \* \* \*